United States Patent
Kleeberger et al.

(10) Patent No.: US 6,616,587 B2
(45) Date of Patent: Sep. 9, 2003

(54) METHOD FOR FOLDING AN AIR BAG

(75) Inventors: Peter Kleeberger, Munich (DE); Christian Strasser, Dusseldorf (DE)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/805,486

(22) Filed: Mar. 13, 2001

(65) Prior Publication Data

US 2001/0036892 A1 Nov. 1, 2001

(30) Foreign Application Priority Data

Apr. 27, 2000 (DE) .......................................... 100 20 677

(51) Int. Cl.[7] .................................................. B31B 1/52
(52) U.S. Cl. ........................ 493/457; 493/449; 493/451
(58) Field of Search ................................. 493/457, 449, 493/451, 459; 280/743.1, 728.1

(56) References Cited

U.S. PATENT DOCUMENTS 5,140,799 A * 8/1992 Satoh
5,162,035 A * 11/1992 Baker .......................... 493/451
5,200,013 A * 4/1993 Traber
5,775,733 A * 7/1998 Lunt et al. ................. 280/743.1
5,865,465 A 2/1999 Bauer et al. ............... 280/743.1
5,921,575 A * 7/1999 Kretschmer et al.
6,098,286 A * 8/2000 Kreuzer
6,248,052 B1 6/2001 Kleeberger et al. ......... 493/374

FOREIGN PATENT DOCUMENTS

| DE | 19535564 A1 | 3/1997 | .......... B60R/21/26 |
| DE | 29712437 U1 | 12/1997 | .......... B60R/21/26 |
| DE | 19831613 A1 | 1/2000 | |
| DE | 10054910 1 | 9/2002 | |
| EP | 1193138 A2 | 7/1999 | |
| EP | 0972683 A1 | 1/2000 | |
| EP | 1149741 A2 | 4/2001 | |

* cited by examiner

Primary Examiner—Eugene Kim
Assistant Examiner—Sameh Tawfik
(74) Attorney, Agent, or Firm—Scott A. McBain

(57) ABSTRACT

The invention relates to a method for folding together an inflatable airbag jacket of an airbag module for motor vehicles, in which the at least partly spread out airbag jacket is arranged in at least one folding pocket and a folding volume of the folding pocket which contains the airbag jacket is reduced in size.

29 Claims, 2 Drawing Sheets

METHOD FOR FOLDING AN AIR BAG

TECHNICAL FIELD

The invention relates to a method and to an apparatus for folding together an inflatable airbag jacket of an airbag module for motor vehicles.

BACKGROUND OF THE INVENTION

Airbag modules for vehicle airbags are manufactured in large quantities. One therefore attempts to simplify and speed up the manufacture of the airbag modules, which includes the folding together of the airbag jacket.

The problem (object) of the invention is to create a possibility of manufacturing airbag modules for motor vehicles as rapidly and simply as possible, with it being desirable for this possibility also to be given in particular for side airbag arrangements in which the airbag deploys downwardly in the manner of a curtain along a vehicle side wall in the vehicle in the event of an accident.

SUMMARY OF THE INVENTION

This object is satisfied by the features of the method claim 1 and in particular in that the at least partly spread out airbag jacket is arranged in at least one folding pocket and a folding volume of the folding pocket which contains the airbag jacket is reduced in size.

In accordance with the invention the airbag jacket is folded together or gathered by means of the folding pocket in that the folding volume, that is, that region of the folding pocket in which the airbag jacket is arranged, is reduced in size. An essential advantage of the invention consists in that the folded together airbag jacket is still arranged within the folding pocket at the end of the folding process. The folding of the airbag can thus be secured through the folding pocket which surrounds the folded together airbag jacket.

At the same time the folding pocket serves as a cover which protects the folded together airbag jacket. Thus no further measures are required for the securing of the folding and for the protection of the folded airbag jacket. The folding pocket with the folded together airbag jacket which is arranged in it can be mounted in a vehicle as an airbag module or as constituent of the airbag module.

Through the folding method in accordance with the invention consequently the folding together of the airbag jacket and thus the manufacture of airbag modules is considerably simplified and speeded up.

A further advantage of the folding of the airbag jacket in accordance with the invention in a folding pocket consists in that the danger of damage to the airbag jacket is a minimum, since the airbag jacket comes in contact exclusively with the folding pocket and a direct contact with other objects is avoided.

Advantageous is also that the folding volume of the folding pocket can in principle be brought to any size as small as desired. Through reducing the size of the folding volume a minimum packing size of the folded together or gathered airbag jacket can therefore be achieved.

In principle the folding method in accordance with the invention can be used for the manufacture of any desired packing shapes of the folded together airbag jacket. In accordance with a particularly preferred exemplary embodiment of the invention the airbag jacket is folded together to form an elongate packing shape.

Through this the folding method in accordance with the invention can be used in the manufacture of side airbag arrangements, the airbag of which deploys in the manner of a curtain in the event of an accident.

The side airbag arrangements can comprise at least one gas tube which is provided with a gas outlet opening and which extends at least region-wise through the airbag jacket. Through fixing the gas tube the airbag jacket can be fixed region-wise, so that the airbag jacket can be pressed against the fixed gas tube through moving the folding pocket relative to the gas tube. The gas tube thus serves as a support or holding member for the airbag jacket.

This folding possibility is in principle also given in other support or holding members which are provided at airbag modules, which are fixed through suitable means and against which the airbag jacket is pressed by means of the folding pocket through reduction of the folding volume.

In accordance with a further preferred exemplary embodiment of the invention at least one material layer is laid around the airbag jacket for forming the folding pocket.

In this the folding pocket can be formed in a particularly simple way by a single material layer, which is e.g. first spread out and onto which the at least partly spread out airbag jacket is then placed. Through folding over of the region of the material layer which is not covered by the airbag jacket the folding pocket then arises, between the side walls of which the airbag jacket is arranged in a planar manner.

In principle a hanging folding pocket with substantially vertical side walls, between which the airbag jacket is hung, can also be provided in accordance with the invention. Through drawing upwards of at least one side wall of the folding pocket the airbag jacket is then moved in the direction of a fixed region of the airbag jacket and e.g. pressed against a gas tube which fixes the airbag jacket.

In accordance with a further preferred embodiment of the invention the folding volume is reduced in size at least substantially without folding the folding pocket.

Through this it is ensured that the airbag jacket is always surrounded by a substantially fold-free jacket both during the folding together and in the finally folded together state. An interlocking of the folding pocket and the airbag jacket is thus reliably avoided.

In this it is preferred for the volume reduction to take place through moving the folding pocket, in particular through drawing at the folding pocket, in a direction which extends approximately parallel to the plane of spreading out of the airbag jacket. For this, preferably one side wall of the folding pocket is fixed and the folding volume is reduced in size through drawing at another, in particular at the oppositely lying, side wall of the folding pocket.

In accordance with a further preferred exemplary embodiment of the invention the reduction of the folding volume takes place within a folding space, through which the packing size of the airbag jacket is limited during the folding together in directions which deviate from a folding direction, in particular approximately perpendicular to the folding direction.

Through folding together of the airbag jacket within a folding space of this kind it is automatically ensured that a maximum size of the package formed by the folded together airbag jacket, which can be set through the choice of the dimensions of the folding space, is not exceeded. The folding principle in accordance with the invention, in which the airbag jacket is folded together or gathered by means of the folding pocket, is in principle independent of the size of the folding space and requires in particular—apart from the material thickness of the airbag jacket and of the folding pocket—no minimum dimensions of the folding space, so that airbag jacket packages of in principle any desired size can be produced through adjusting the folding space dimensions.

Furthermore, it is preferred for the reduction of the folding volume to take place between two limiting surfaces which extend at least substantially parallel and which are formed in particular at plate-shaped limiting members.

The folding space can e.g. be formed by two plates which extend in parallel, so that the airbag jacket is folded together between the two plates. The reduction of the folding volume of the folding pocket and thus the folding of the airbag jacket takes place in a folding direction which lies in a plane which extends approximately parallel to the plates. Perpendicularly to this folding direction the dimensions of the airbag jacket package which arises during the folding together are limited through the plates to the plate spacing.

In accordance with a further preferred embodiment of the invention the folding pocket is closed after the folding together of the airbag jacket to the final packing size. In particular through connection, preferably welding and/or sewing, of oppositely lying side walls of the folding pocket.

Through this the folding pocket forms a protective envelope which surrounds the folded together airbag jacket and which on the one hand secures the folded package produced in that it prevents an unfolding or relaxation of the airbag jacket, and which on the other hand protects the airbag jacket from external influences. Additional measures for securing the folding or for protecting the airbag jacket respectively can therefore be dispensed with.

The object of the invention is also satisfied through the features of the apparatus claim 13 and in particular in that the apparatus comprises at least one folding pocket for the reception of the at least partly spread out airbag jacket and an actuation device by means of which a folding volume of the folding pocket which contains the airbag jacket can be reduced in size.

The folding pocket is preferably manufactured of a textile and/or fabric material, for example of nylon.

Through this, ideal flexibility and stability properties can be imparted to the folding pocket.

In accordance with a further preferred embodiment of the invention the folding pocket is provided with at least one preferably line-shaped or strip-shaped tear-open region.

The folding pocket can thereby serve as a cover or envelope for the folded together airbag jacket in the state of being mounted in a vehicle, which tears open during the inflation of the airbag at the tear-open region which is provided for this purpose in order to enable the deployment of the airbag jacket.

In accordance with a further preferred exemplary embodiment of the invention a fixing device for the airbag jacket is provided, which is preferably arranged outside a folding space for the folding pocket.

The fixing of the airbag jacket enables the folding pocket to be moved relative to the fixed region of the airbag jacket and the airbag jacket to be folded together or gathered respectively by means of the folding pocket in the direction of the fixed region of the airbag jacket.

In this it is preferred for the fixing device to be formed for the fixing of a support member of the airbag module, to which the airbag jacket is connected.

In this the airbag jacket can be pressed together between the folding pocket and the support member in that the airbag jacket is for example drawn or gathered respectively against the support member through drawing at the folding pocket.

The support member can be the gas tube of an airbag module for a side airbag arrangement, which extends at least region-wise within the airbag jacket.

The gas tube which serves for the inflation of the airbag and which is preferably provided with a plurality of gas outlet openings serves here at the same time as an abutment for the airbag jacket which is pressed together or gathered respectively by means of the folding pocket.

The folding apparatus in accordance with the invention can be designed in such a manner that at the end of the folding process the gas tube is arranged within the folding pocket together with the folded together airbag jacket. Thus at the end of the folding process a module is present which is ready for installation and which can be installed in a vehicle as an airbag module or as a constituent of the airbag module.

In accordance with a further preferred exemplary embodiment of the invention the folding apparatus is subdivided into a plurality of sections, which can preferably be displaced relative to one another. The subdivision into a plurality of sections enables a specific packing shape of the folded together airbag jacket to be intentionally realized which is predetermined through the manner of the arrangement of the sections. Through the preferred displaceablity of the sections, different packing shapes of the folded together airbag jacket can be achieved with one folding apparatus.

In particular for forming differently curved elongate packing shapes the fixing or clamping device respectively which is provided for fixing the airbag jacket or a gas tube of the airbag jacket respectively can be designed to be displaceable.

An airbag module which comprises the folded together airbag jacket and which is a constituent of a side airbag arrangement can thereby be intentionally adapted to the respective use or vehicle type.

Further preferred embodiments of the invention are also set forth in the subordinate claims, the description and the drawings.

BRIEF DESCRIPTION OF THE DRAWINGS

The invention will be described in the following in an exemplary manner with reference to the drawings. Shown are.

DESCRIPTION OF THE PREFERRED EMBODIMENTS

Figure 1A:
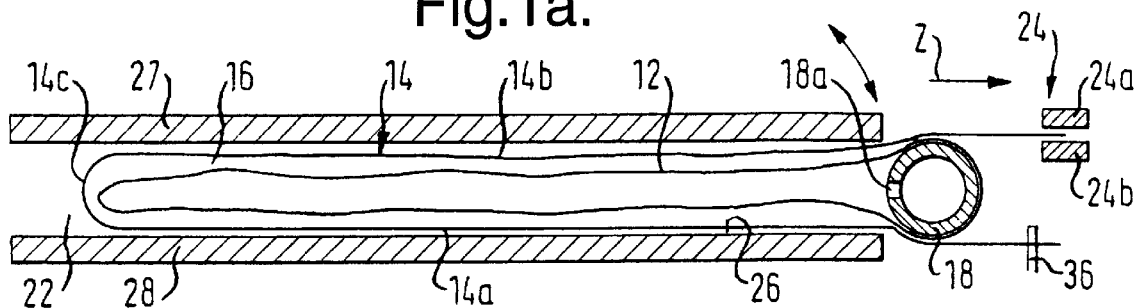
FIGS. 1a–1c are, in each case in a sectioned side view, of different phases of a folding of an airbag jacket which is carried out in accordance with the invention.

The invention will be described in the following using as an example an airbag for a side airbag arrangement which comprises an airbag jacket 12 and a cylindrical gas tube 18 which passes through the airbag jacket 12 and which is provided with a plurality of gas outlet openings 18a.

The folding apparatus comprises two plates 27, 28, which extend parallel to one another in the horizontal direction in the operating position in accordance with FIGS. 1a–1d. The plates 27, 28 bound a folding space 22 of small height in comparison with the extension of the plates 27, 28. The folding space 22 can be opened and closed through pivoting the upper plate 27 in manner indicated by the arrow in FIG. 1a. Furthermore, the plates 27, 28 can be moved relative to one another in such a manner that the plate spacing, i.e. the height of the folding space 22, can be adjusted continuously.

Furthermore, the folding apparatus comprises a material layer 14 which consists of a fabric material which is for example manufactured of nylon. At the beginning of the folding process the material layer 14 is spread out on the lower plate 28 with the upper plate 27 being pivoted upwards and is pushed at an edge region onto holding pins 36 which are distributedly arranged along the gas tube 18.

Then the spread out airbag jacket 12 with the plugged in gas tube 18 is laid onto the material layer 14, which is fixed by means of the holding pins 36. Then the region of the material layer 14 which is not covered by the airbag jacket 12 is folded over and laid onto the airbag jacket 12.

The airbag jacket 12 is thereby arranged in a folding pocket which is formed by the material layer 14 and is located within a folding volume 16 of the folding pocket 14 which is bounded on the one side by the gas tube 18, on the opposite side by the base 14c of the folding pocket 14 and by the opposite side walls 14a, 14b of the folding pocket 14.

Then the folding space 22 is closed by pivoting the upper plate 27 downward.

Prior to the folding together of the airbag jacket 12 the gas tube 18 which is arranged outside the folding space 22 in the region of a longitudinal side of the plate arrangement 27, 28 is fixed by means of clamping devices which are not illustrated in FIGS. 1a–d. The clamping devices will be discussed in more detail in the following in connection with FIGS. 2 and 3.

The upper side wall 14b of the folding pocket 14 is connected outside the folding space 22 to a merely schematically illustrated actuation device 24. For this the side wall 14b is clamped in between two clamping jaws 24a, 24b of the actuation device 24. The means for coupling the folding pocket 14 or the upper side wall 14b of the folding pocket 14 respectively to the actuation device 24 can in principle be designed in any desired manner.

The actuation apparatus 24 can be moved approximately perpendicular to the longitudinal extent of the gas tube 18 in a drawing direction Z in a plane which is parallel to the plates 27, 28 and thus parallel to the plane of the spreading out of the airbag jacket 12. The actual folding process begins through moving the drawing or actuation device 24 respectively, through which the upper side wall 14b of the folding pocket 14 is drawn out from the folding space 22 and thus the folding volume 16 of the folding pocket 14 which contains the airbag jacket 12 is reduced in size.

Figure 1B:
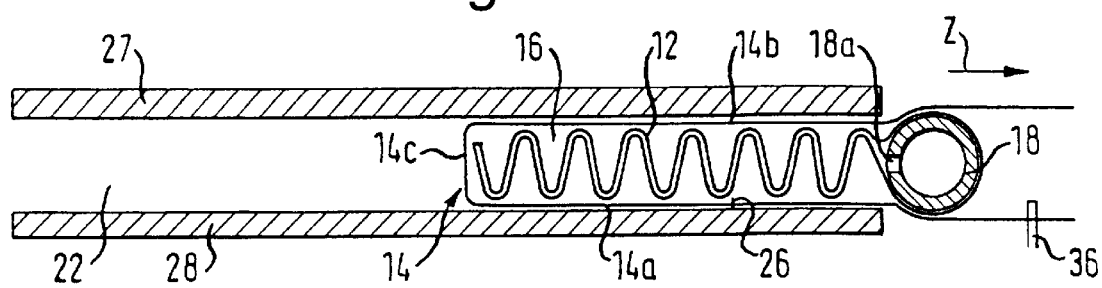

As can be seen in particular in FIG. 1b, which illustrates an intermediate state of the folding process, the reduction of the folding volume 16 takes place without folding the folding pocket 14. The regions of the side walls 14a, 14b of the folding pocket 14 which are located in the folding space 22 between the two plates 27, 28 extend parallel to the plates 27, 28 during the folding process.

As a result of the reduction of the folding volume 16 through drawing at the upper side wall 14b of the folding pocket 14 the airbag jacket 12 is pressed together between the base 14c of the folding pocket 14 and the gas tube 18. This process can also be designated as gathering, pressing, squashing, crumpling or creasing together.

Figure 1C:
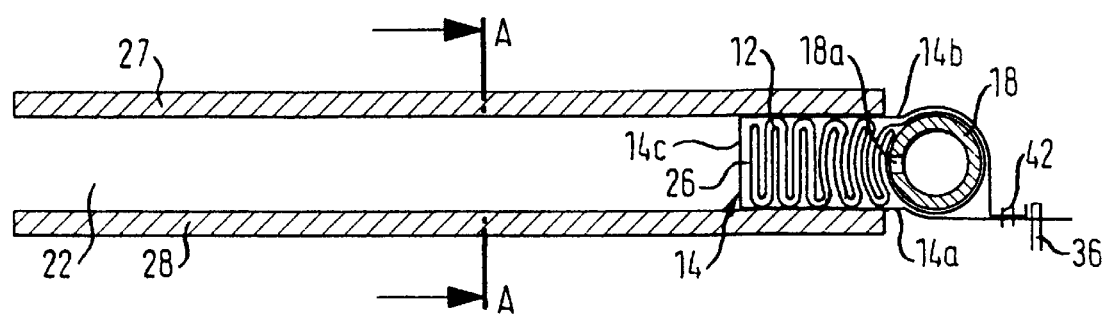

The folding of the airbag jacket 12 which thereby develops is illustrated in FIGS. 1b and 1c as a substantially regular, accordion-like folding. In principle the manner of the folding is subject to chance, and in this folding method a completely irregular folding of the airbag jacket 12 or one having both regular and irregular portions can also develop.

The extent perpendicular to the drawing or folding direction Z respectively of the airbag jacket package which arises during the folding is limited by the height of the folding space 22 and thus by the spacing of the two plates 27, 28. In this exemplary embodiment the plate spacing is approximately equal to the outer diameter of the gas tube 18.

FIG. 1c shows the finally folded together state, in which the airbag jacket 12 is folded together or drawn together to the desired final packing size. When this state has been reached the two side walls 14a, 14b of the folding pocket 14 are connected to one another between the gas tube 18 and the holding pins 36 on the side of the gas tube 18 which faces away from the airbag jacket package. This connection can for example be realized through ultrasonic welding or sewing.

Through this closing of the folding pocket 14 the airbag jacket 12 is fixed in its finally folded together state, so that it can not relax and unfold by itself. In addition the folded together airbag jacket 12 is arranged ready to mount in a cover or envelope which is formed by the folding pocket 14 at the end of the folding process.

After the opening of the folding space 22 through pivoting the upper plate 27 upwards, the constructional group consisting of the gas tube 18, the folded together airbag jacket 12 and the folding pocket 14 can be removed from the folding apparatus.

In accordance with the invention in this exemplary embodiment the material layer 14 thus becomes a folding pocket 14 in the preparation of the folding process and becomes a constituent of the airbag module which forms a cover or envelope of the airbag jacket 12 through the folding process.

A substantial advantage of the invention consists in that a maximum packing density of the folded together airbag jacket 12 and thus a minimum packing size can be achieved in the above described manner of the folding. The more tightly the folding pocket 14 is drawn together by means of the actuation device 24, the greater will be the final packing density.

The packing size in the drawing direction Z can consequently be set through the length of the drawing path which is traveled by the actuation device 24 in this drawing direction Z, whereas the dimensions of the airbag jacket packing perpendicular to the drawing direction Z can be predetermined through the spacing of the plates 27, 28.

Figure 1D:
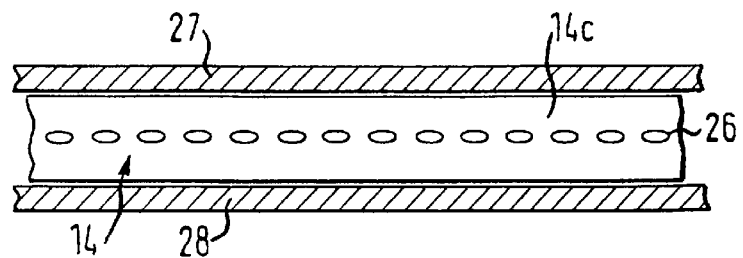
FIG. 1d is a section along line A—A of FIG. 1c.

In particular FIG. 1d shows that a line-shaped tear-open region 26 which extends parallel to the gas tube 18 and which is formed as a tear-open seam is provided in the region of the material layer 14, which forms the base 14c of the folding pocket 14 when the airbag jacket 12 is finally folded together.

The tear-open seam 26 is designed in such a manner that it tears open in the event of an accident through inflation of the airbag jacket 12 by means of the gas tube 18 in order to enable a free unfolding of the airbag jacket 12.

Figure 2:
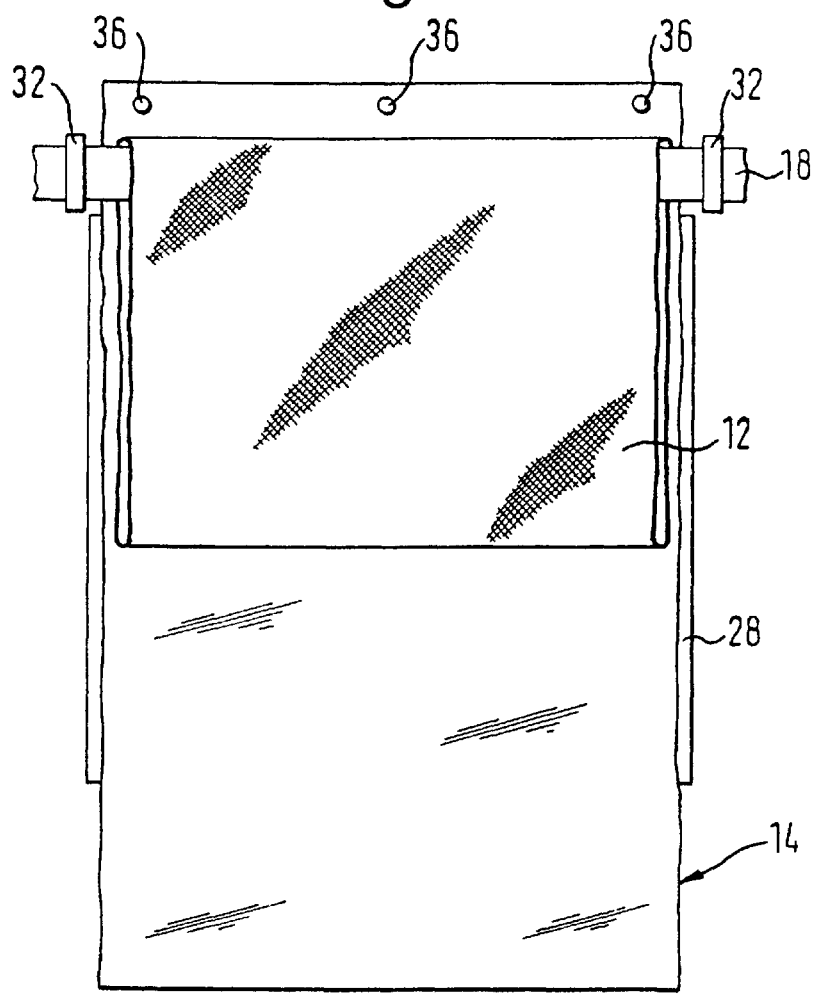
FIG. 2 is a plan view of a portion of the folding apparatus.

FIG. 2 shows a plan view of a portion of the folding apparatus in accordance with the invention without the upper plate 27 prior to the forming of the folding pocket. The material layer 14 which later forms the folding pocket is spread out on the lower plate 28, whereas the airbag jacket 12, through which the gas tube 18 passes, lies on the material layer 14 in the spread out state. Clamping devices 32 for fixing the gas tube 18 are arranged laterally to the plate 28. Furthermore, the holding pins 36 which serve for fixing the material layer 14 are illustrated.

The fixing means 32 and 36 for the gas tube 18 or the folding pocket 14 respectively can in principle be designed in any desired manner.

Figure 3:
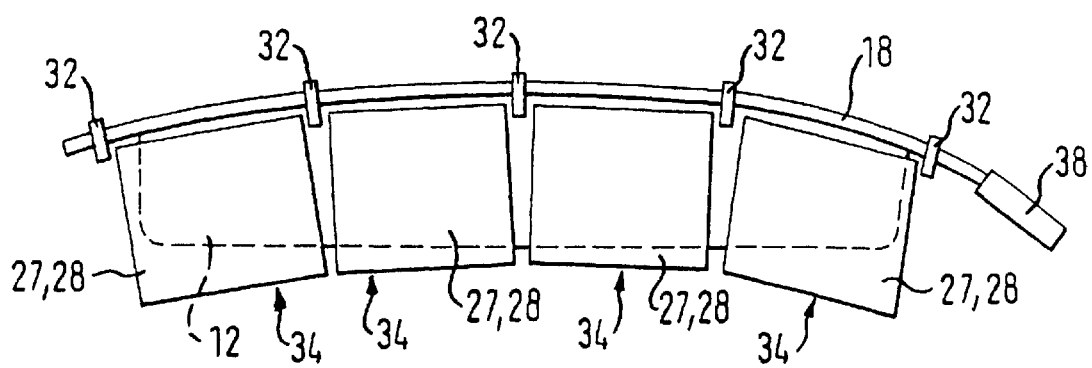
FIG. 3 is a plan view of the entire folding apparatus, which is subdivided into a plurality of sections.

In FIG. 2 only a partial section of the gas tube 18, of the airbag jacket 12 and of the material layer 14 which later forms the folding pocket is in each case illustrated. As FIG. 3 shows, the folding apparatus in accordance with the invention is subdivided into a plurality of sections 34, which comprise four plate arrangements 27, 28 in the illustrated exemplary embodiment. The plate arrangements 27, 28 are arranged adjacently to one another in accordance with the curvature of the gas tube 18. The gas tube 18 is connected with one end to a gas generator 38, which is also designated as an inflator.

The material layer 14, which is not illustrated in FIG. 3, can extend over the full length of the airbag jacket 12 or comprise a plurality of sections which are arranged one after the other along the gas tube 18.

The clamping devices 32 of the folding apparatus in accordance with the invention which serve for fixing the gas tube 18 are mutually displaceable, just as the plates 27, 28, which are in each case arranged between two clamping devices 32, so that the folding apparatus can be used in conjunction with gas tubes 18 of any desired curvature. Thus through the invention elongate packing shapes of the folded together airbag jacket 12 of any desired curvature can be achieved.

What is claimed is:

1. A method for folding an inflatable airbag jacket of an airbag module adapted for use in a vehicle, comprising:
   spreading out the airbag jacket on top of a portion of a material layer;
   folding said material layer about the airbag jacket to define a folding volume in which the airbag jacket is enclosed;
   enclosing the folded material layer between two plates; and
   reducing the folding volume wherein the airbag jacket is folded upon itself as the folding volume is reduced.

2. The method as in claim 1, wherein the airbag jacket is folded together to form an elongate packing shape.

3. The method as in claim 1, wherein the folding volume is reduced in size without folding the material layer.

4. The method as in claim 1, wherein the airbag jacket is fixed at a region and is moved, in particular drawn, by means of the material layer in the direction of the fixed region.

5. The method as in claim 1, wherein the airbag jacket is pressed together between the folding pocket material layer and a fixed support member of the airbag module to which the airbag jacket is connected, the support member being formed by a gas tube which extends at least region-wise within the airbag jacket.

6. The method as in claim 1, wherein the volume reduction takes place through moving the material layer in a direction (Z) which extends approximately parallel to the plane of the spread out airbag jacket.

7. The method as in claim 1, wherein one side wall of the material layer is fixed and the folding volume is reduced in size through drawing another side wall of the material layer in the Z direction.

8. The method as in claim 7, wherein the reduction of the folding volume takes place within a folding space defined by the folded material layer wherein the packing size of the airbag jacket is limited during the reduction of the folding volume together in directions which deviate from a folding direction (Z), in particular approximately perpendicular to the folding direction (Z).

9. The method as in claim 8, wherein the reduction of the folding volume takes place between the two plates which provide two limiting surfaces.

10. The method as in claim 1, further comprising:
    securing oppositely lying side walls of the material layer after the folding volume has been reduced to a desired configuration.

11. The method as in claim 1, wherein the airbag jacket is fixed at a region and material layer is fixed at one end and the other end is drawn towards said region to reduce the folding volume.

12. The method as in claim 1, wherein the inflatable airbag jacket is adapted for use in a vehicle side wall.

13. The method as in claim 1, wherein the material layer has a line shaped tear open region.

14. The method as in claim 1, wherein the material layer provides an outer covering for the inflatable airbag jacket.

15. A method for folding an airbag for use in a vehicle, comprising:
    expanding the un-inflated airbag onto a first portion of a material layer;
    folding a second portion of said material layer over the expanded airbag and said first portion to define an enclosure for enclosing the expanded airbag; and
    folding the airbag into a desired configuration by reducing said enclosure by drawing either said first portion or said second portion of said material layer in a direction parallel to a plane of the airbag.

16. The method as in claim 15 further comprising:
    enclosing said first portion and said second portion of said material layer between a pair of plates prior to drawing either said first portion or said second portion of said material layer.

17. The method as in claim 15, wherein a first portion of the airbag is disposed about an inflator for inflating the airbag.

18. The method as in claim 17 further comprising:
    enclosing said first portion and said second portion of said material layer between a pair of plates prior to drawing either said first portion or said second portion of said material layer, said pair of plates being in a facing spaced relationship wherein a dimension exists between them, said dimension being at least the same dimension as said inflator.

19. The method as in claim 15, wherein said first portion of said material layer is fixedly secured at an area proximate to said inflator and said enclosure is reduced by drawing said second portion towards said inflator.

20. The method as in claim 15, wherein the material layer has a line shaped tear open region.

21. The method as in claim 20, wherein the material layer provides an outer covering for the airbag.

22. The method as in claim 21, wherein the airbag is adapted for use in a vehicle side wall.

23. A method for folding an airbag for use in a vehicle, comprising:
    expanding the un-inflated airbag onto a first portion of a plurality of material layers;
    folding a second portion of said plurality of material layers over the expanded airbag and said first portion of said plurality of material layers to define a plurality of enclosures for enclosing portions of the expanded airbag; and folding the airbag into a desired configuration by reducing said plurality of enclosures by drawing either said first portion or said second portion of said plurality of material layers in a direction parallel to a plane of the expanded airbag.

24. The method as in claim 23 further comprising:

enclosing said first portion and said second portion of said plurality of material layers between a plurality of pairs of plates prior to drawing either said first portion or said second portion of said plurality of material layers.

25. The method as in claim 24, wherein a first portion of the airbag is disposed about an inflating member of an inflator for inflating the airbag.

26. The method as in claim 25, wherein said inflating member has an arcuate shape.

27. The method as in claim 26, wherein said plurality of pairs of plates are each in a facing spaced relationship wherein a dimension exists between them, said dimension being at least the same dimension as said inflating member.

28. The method as in claim 27 wherein said first portion of said plurality of material layers is fixedly secured at an area proximate to said inflating member and said enclosures are reduced by drawing said second portion of said plurality of material layers towards said inflating member.

29. The method as in claim 24, wherein the airbag is adapted for use in a vehicle side wall.

* * * * *